Patented May 7, 1946

2,399,877

UNITED STATES PATENT OFFICE 2,399,877

CHEMICAL PROCESS, ETC.

John G. McNab, Cranford, and Dilworth T. Rogers, Teaneck, N. J., assignors to Standard Oil Development Company, a corporation of Delaware No Drawing. Application July 7, 1944, Serial No. 543,971

7 Claims. (Cl. 252—42.7)

This invention relates to an improved process of preparing or improving metal derivatives of alkyl phenols or their derivatives, as well as to the products thus prepared and to uses thereof. As a specific instance, the invention relates to the improvement of chemical compounds such as the barium salt of tert.-octyl phenol sulfide or disulfide, the calcium salt of tert.-amyl sulfide, the barium salt of 2,4-di tert.-amyl phenol sulfide, etc.

Chemical compounds of the class just referred to have been used as lubricating oil additives, particularly in heavy duty oils used for lubricating high speed Diesel and gasoline engines, for the reason that these additives have excellent detergent properties and improve the performance of the lubricant. As ordinarily prepared, these additives do, however, possess to some extent the undesirable property of being water-sensitive, that is when very thoroughly contacted with a small amount of water, they form a sludge which may remain emulsified in the oil or settle out as a flocculent precipitate. This characteristic of the additive, while not affecting the performance of the oil, is nevertheless undesirable in certain respects such as in storage or handling where the oil is apt to become contaminated with water.

The primary object of the present invention is therefore to treat such additives during the process of manufacture in order to render them water-insensitive so that lubricating oils, or other products in which they may be used, will not tend to emulsify or form sludge when contacted with water. Another object is to make a product which will also actually give improved performance in lubricating an internal combustion engine.

Before discussing the particular improvements of this invention, the general manufacture of such products will be explained as applied, for example, to the treatment of alkylated hydroxy aromatic compounds, such as a tertiary octyl phenol with a sulfurizing agent, e. g. sulfur dichloride or sulfur monochloride, to form an alkyl hydroxy aryl sulfide which is then converted into a corresponding metal derivative by neutralization, preferably in oil solution, with a basic metal neutralizing agent such as barium hydroxide, thus forming a barium salt of an alkyl hydroxy aryl sulfide. Throughout this specification and the claims the word "sulfide" is used in a generic sense to include monosulfide, disulfide or polysulfide or mixtures of these as well as polymers of the alkyl phenol sulfides. Such a process may be illustrated by the reaction of about 2 mols of tertiary octyl phenol with 1 mol, or a slight excess, of sulfur dichloride to produce tertiary octyl phenol sulfide. The reaction is preferably conducted in such solvents as dichloroethene, chloroform, petroleum naphtha, benzol, and the like. When preparing the alkyl phenol sulfides on a commercial scale, using technical grades of sulfur dichloride, ratios of 1.5 or so mols of $SCl_2$ to 2 mols of alkylated phenol will often be found desirable. In such a case, although the product may be expected to be essentially an alkyl phenol monosulfide, some quantities of polysulfides and of polymeric materials will also be formed. (The tertiary octyl phenol is readily prepared by known methods by alkylating phenol with diisobutylene in the presence of suitable catalysts.) In practice the phenol sulfide is then usually dissolved in a suitable mineral lubricating oil base stock in about 25 to 50%, usually about 40% concentration, with or without incorporation of lesser amounts of other additives such as higher aliphatic alcohols, e. g. stearyl alcohol, or aliphatic nitriles, etc. used as defoamers, plasticizers, mutual solvents or as detergency promoters, and finally this solution is neutralized with the desired basic metal compound such as barium hydroxide octahydrate or monohydrate. The resulting product, after filtration, is a mineral oil concentrate of barium tertiary octyl phenol sulfide. Barium tertiary octyl phenol monosulfide may be represented by the general formula $Ba[O(C_8H_{17})C_6H_3]_2S$ or, if the tertiary octyl group is assumed to be in a position para to the phenolic oxygen, and the sulfur linkage in a meta position, by the following graphic formula:

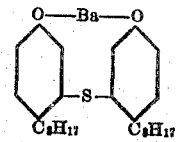

If the sulfur linkage is in an ortho position the graphic formula would be:

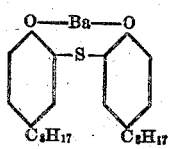

The exact location of the various radicals and linkages in such compounds has not been determined with certainty, but it is probable that the product resulting from the commercial operation of the described process is a mixture of compounds having the radicals and linkages in several different positions, there being possibly some sulfur linked in each of the ortho and meta positions, and some tertiary octyl groups in an ortho position or even in a meta position unless the original tertiary octyl phenol used was an absolutely pure para compound. Also it is more than likely that the commercial product which may be given the general formula $$Ba[O(C_8H_{17})C_6H_3]_2S_n$$

where $n$ has an average value of at least 1.0 and less than 2.0, contains at least small amounts of disulfide and polysulfide compounds as well as some polymeric material. In any event corresponding compounds may readily be made by starting with ortho or meta alkyl phenols, and mixed alkyl phenols may be used with alkyl groups in any two or more positions. If desired, dialkyl phenols may also be used such as 2,4-ditertiary butyl phenol, 2,4-diamyl phenol, 2,6-diamyl phenol, ditertiary octyl phenol, etc. For some purposes it may even be desirable to use alkyl hydroxy aryl compounds having more than two alkyl groups, but the monoalkylated and dialkylated products are preferred.

The invention is considered to apply broadly to substituted metal phenolate compounds containing at least one grouping having the general formula M—Y—Ar(X)$_n$ where M is a metal, Y is an element in the righthand side of group VI of the periodic table (Mendeleeff), Ar is an aromatic nucleus which contains like or unlike substituents, X, $n$ in number, replacing nuclear hydrogen, $n$ being at least one.

M may be any metal, such as barium, calcium, aluminum, cobalt, chromium, magnesium, manganese, sodium, nickel, lead, tin, zinc, copper, iron, cadmium, potassium, lithium and the like, polyvalent metals being preferred.

The substituents, X, may be organic or inorganic, or both but at least one such group should be an element of the sulfur family or a group linked to Ar through such an element. The other substituent may be alkyl radicals or groups containing one or more of the non-metallic elements belonging to groups V, VI, and VII of the periodic system (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like, or they may be organic radicals containing one or more of the inorganic groups.

In these salts, if only one of the valences of a polyvalent metal is connected to a substituted phenolic radical, such as —O—Ar(X)$_n$, the other may be connected to other organic groups or to inorganic constituents. For convenience, non-phenolic radicals or groups attached to the metal are indicated broadly by R in the following types of compositional formulae, which broadly represent metal derivatives of substituted phenolic compounds containing the characteristic compositional grouping described:

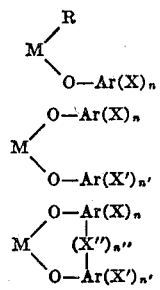

Where oxygen is shown in these formulae it may be replaced by sulfur, selenium or tellurium, as in the case of thiophenolic compounds.

Metal derivatives of the following illustrative types of substituted phenolic compounds are among those that can be used, in which R represents an alkyl group, preferably having at least 4 carbon atoms:

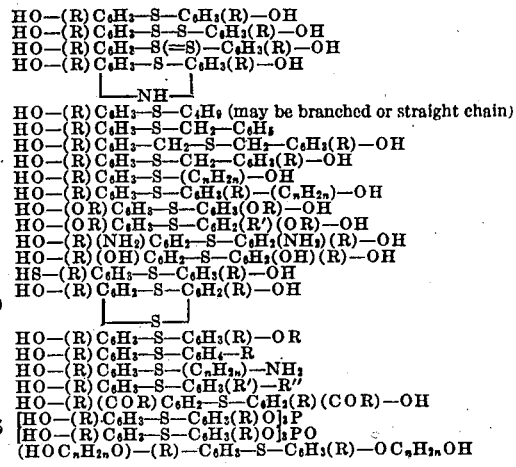

Such phenolate derivatives may also contain sulfur in other positions or groups at the same time as in the places shown in the formulae. More broadly it may be stated that inorganic substituents, particularly negative inorganic groups containing non-metallic elements of groups V, VI, and VII of the Mendeleeff Periodic System, especially sulfur, beneficially influence the phenolates by increasing their potency for stabilizing the lubricating oils.

Especially preferred, because they are both very efficient and also lend themselves to easy and economical manufacture, are compounds containing at least one grouping having the general formula:

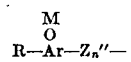

Where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkenyl group, and preferably contains at least 4 aliphatic carbon atoms but may contain many more, such as 8, 10, 16, 18, 24, etc.

The configurations of the compounds are not limited to certain positions for the substituent groups, for these may be in ortho, para, or meta relations to one another. Also, the substituents, X, in broader formulae discussed previously in any aromatic nucleus may be alike or different.

The aromatic nucleus may be polycyclic as in naphthalene, phenanthrene, biphenyl, etc. Where oxygen occurs, it may be replaced by sulfur, selenium, or tellurium as in the case of thiophenolic compounds.

These metal phenolate sulfides are benefited in solubility and effectiveness as hydrocarbon lubricating oil blending agents when they contain a total of at least 5 and preferably 8 or more carbon atoms per molecule in aliphatic groupings.

Specific examples of preferred substituted phenolates falling into the classes mentioned, having at least one alkyl radical as a substituent, and using barium as example of a suitable metal, are formulated as follows:

I. Thioethers (monosulfides) of alkyl phenolates

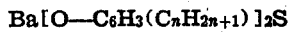
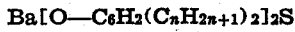

e. g. barium tertiary octyl phenol sulfide, barium tertiary amyl cresol sulfide, barium 2,4-ditertiary amyl phenol sulfide, barium isohexadecyl phenol sulfide.

II. Disulfides of alkyl phenolates

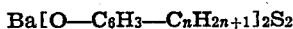

e. g. salts of tertiary amyl phenol disulfide, isohexadecyl phenol disulfide, etc.

III. Phosphorus acid esters of alkyl phenol sulfides

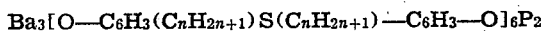

e. g. salts of tertiary amyl phenol sulfide monophosphite.

Other examples of metal alkyl phenol sulfides which may be treated in accordance with the present invention include: calcium tertiary amyl phenol sulfide, tin salts of wax alkylated salicylic acid sulfide, magnesium tertiary octyl phenol sulfide, and barium salts of $C_{16}$–$C_{20}$ branched chain alkyl phenol sulfides prepared from phenols alkylated with refinery butene polymers, etc. An example of a trivalent metal alkyl phenol sulfide is aluminum tertiary amyl phenol sulfide which may be represented in a general way by the formula $[(C_5H_{11}—C_6H_3—O)_2S]_3Al_2$ which may be written out more in detail as follows:

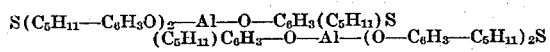

Also contemplated within the scope of the present invention is the treatment of basic metal salts of alkyl phenol sulfides. In a normal alkyl phenol salt of a divalent metal the ratio of metal to phenol sulfide is 1:1 as in the following formula:

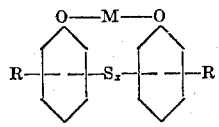

In a basic salt the ratio of metal to phenol sulfide may be 2:1 or even 3:1. In the case of a 2:1 ratio the formula may be for example:

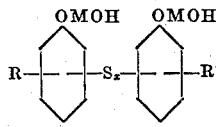

In the case of a 1.5 to 1 ratio the formula may be

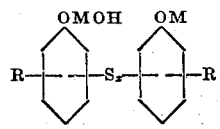

In the case of a 3:1 ratio the formula may be:

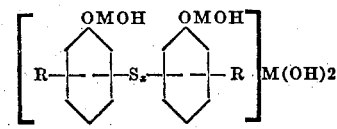

Intermediate ratios of metal to phenol sulfide, such as 1.8 to 1 or 2.3 to 1, for instance, may occur, in which mixtures of the above types of compounds occur.

One method of preparing such basic salts is to treat alkyl phenol sulfides with more than the amount of metallic oxide or hydroxide theoretically necessary to form the normal salts, e. g., with 225% of the barium hydroxide theoretically required to form a normal barium salt.

The alkyl hydroxy aryl compound should have more than three aliphatic carbon atoms and preferably more than 6, such as 8, 10, 12, etc., up to 24 or more as in the case of paraffinic radicals derived from paraffin wax or olefinic polymers, such as dimers, trimers, tetramers, etc., of isobutylene. Branched, especially highly branched, alkyl radicals are preferred.

Instead of using pure individual phenolic materials, one may use crude commercial products which may be mixtures of two or more alkyl hydroxy aryl compounds, such as crude petroleum phenols which have an average chemical composition indicating the presence of four aliphatic carbon atoms and an amount of oxygen slightly in excess of that called for by the formula $C_4H_9C_6H_4OH$. Similarly, crude phenolic materials of coal tar origin may be used such as the so-called tri-cresol which is a mixture of isomeric ortho, meta and paracresols, which should, of course, be further alkylated with a higher alkyl group, for best results from an oil-solubility point of view.

The sulfides, disulfides, etc., of such substituted phenols are generally made, according to known methods, by reaction of the alkyl hydroxy aromatic compound with a sulfurizing agent which is preferably a sulfur halide, e. g. $SCl_2$ or $S_2Cl_2$, a small amount of halogen perhaps being found to combine with the aromatic compound in some unknown manner, but the proportion of such combined halogen is very small and is not objectionable.

Before carrying out the neutralization of the alkyl hydroxy aromatic sulfide for converting the latter into the corresponding metal derivative or salt, the alkylated phenol sulfide is preferably dissolved in a lubricating oil base stock having a viscosity within the approximate limits of 35 to 70 seconds Saybolt at 210° F., derived from any suitable petroleum crude and having any desired viscosity index.

The basic metal neutralizing agent to be used is preferably a finely divided oxide or hydroxide of the desired metal such as an alkaline earth metal, e. g. calcium, barium, magnesium, etc., or other polyvalent metals such as nickel, cobalt, tin, lead, zinc, copper, cadmium, manganese, iron, chromium, aluminum, etc., or even monovalent metals such as sodium, potassium, lithium, etc. Alkaline earth sulfides may be used in place of the oxides or hydroxides if desired.

Metal carbides, hydrides and alkoxides may also be employed as agents for converting the phenol sulfides to metal salts. In using the basic metal neutralizing agent, the reaction has heretofore generally been carried out at a temperature between the approximate limits of about 80° C. and about 150° C., for several hours, for instance heating 1½ hours at 120° C. and finally ¼ or ½ hour at 150° C. to insure complete neutralization and to drive off water formed by the neutralization. The mixture is preferably stirred during this neutralization reaction, for a sufficient length of time to insure complete reaction, and ordinarily an excess of the basic metal neutralizing agent is used so as to insure incorporation of the metal atom in each molecule of the alkyl hydroxy aromatic sulfide, to produce for example a metal alkyl phenol sulfide. This solution is filtered to remove excess metal neutralizing agent and other insoluble particles (if any) to make an oil concentrate, containing, for example, 20 to 50% of the metal salt, which may then be added to any desired lubricating oil base stock to give a finished blend containing about 0.05–2.0%, preferably 0.1 to 1.0% by weight of the metal salt per se.

Now according to the present invention it has been found that if such oil concentrates of the metal alkylated phenol sulfide or disulfide salts are subjected to a heat treatment before or after the filtration step, the water-sensitivity of the detergent additive can be substantially reduced or completely eliminated. If desired, of course, the final blend containing only 0.5 to 1.0% or so of the metal salt can be heat treated, but normally it is preferable to heat treat an oil concentrate of the metal salt, for instance containing from 20 to 50% by weight of the metal salt. In this way heat treating facilities are used more economically, and color degradation of the final blended oil is kept at a minimum.

In carrying out this heat treating procedure, the oil concentrate of metal salt is heated at a temperature between the approximate limits of 140° C. and 210° C. or even somewhat higher, for a period of about 3–50 hours. The exact time and temperature required vary somewhat with the particular salt used (i. e. calcium, barium, magnesium, zinc, etc.) and with the size of the batch being processed, the particular mode of carrying out a continuous treatment, the efficiency of agitation, etc. Generally a treatment of 3–20 hours at 180° C. to 210° C. is sufficient to eliminate the water-sensitivity of an oil concentrate of a metal alkylated phenol sulfide or disulfide salt.

It is also desirable, in carrying out the present invention, to arrange the equipment so that removal of harmful constituents by evaporation, blowing with a gas, etc. may be facilitated. In batch operation this requires efficient stirring and should preferably be carried out in open vessels, or vacuum may be used. An inert gas such as nitrogen may be blown through the oil, either to serve as the means of agitation, or to supplement a mechanical agitator and to assist in removing undesired gases or vapors. For continuous operation, it is desirable to use vertical stripping towers with countercurrent flow of the detergent concentrate, such as the oil solution, fed in at the top of the tower and flowing down through it, while inert gases rise upwardly through the oil. When such a tower is used either the oil solution may be sufficiently heated before entering the tower or it may be heated by steam heating coils in the tower. Also, this tower may be used either without or with baffle plates, bubble trays or packing rings, etc. for assisting in providing intimate contact between the stripping gases and the oil solution. In all types of equipment, the use of scavenging agents such as high boiling hydrocarbons, alkylated phenols, straight chain alcohols, amines and the like accelerate the improvement in water-sensitivity.

The objects and advantages of the invention will be better understood from a consideration of the following examples:

Example 1

A sample of the following additive concentrate was prepared in the laboratory by the method outlined in U. S. Patent 2,294,145: 10 weight percent barium tert. octyl phenol sulfide, 10 weight percent barium tert. octyl phenol disulfide, 5 weight percent commercial stearyl alcohol and 75 weight percent S. A. E. 20 grade lubricating oil. A 5 weight percent blend of this concentrate was made in an SAE 20 grade lubricating oil to give a clear haze-free blend containing 1 weight percent of barium salt. To 200 cc. of this blend in an eight ounce bottle was added 4 cc. of water and the bottle was stoppered and shaken vigorously for 20 seconds. After standing for two weeks the sample of oil was found to have separated into two layers, a clear upper layer and a smaller additive-emulsion layer on the bottom.

A sample of the original oil concentrate of additive was heated for a period of four hours at about 125° C. with stirring and nitrogen blowing. A sample of the heat treated concentrate was then blended in SAE 20 grade lubricating oil to give a clear blend containing 1 weight percent of barium salt. This blend was then shaken with 2% water as before and allowed to stand. Even after a period of one month no separation of emulsion layer was noted. The water separated from the oil, leaving the supernatant oil substantially unchanged.

Example 2

A 2500 gallon batch of an additive concentrate consisting approximately of: 40 weight percent barium tert. octyl phenol sulfide, 6% (by weight) of commercial stearyl alcohol and 54 weight percent of SAE 20 grade lubricating oil was prepared in essentially the same manner as in Example 1. A 2.5 weight percent blend of this concentrate was prepared in SAE 20 grade lubricating oil. A 600 gram sample of this blend was mixed with 6 grams (1 weight percent) of water and placed in a Mixmaster stirring apparatus (egg beater type motor driven mixer) and stirred at full speed for 15 minutes at approximately 90° F. After this stirring period 500 cc. of the emulsified oil was placed in a 500 cc. graduate and allowed to stand for 24 hours at a temperature of approximately 90° F. After this settling period it was noted that 64 cc. of an emulsion layer had separated from the 500 cc. sample of oil.

The 2500 gallons of additive concentrate was then placed in a 5000 gallon steel kettle and heated at 180° C. with vacuum and nitrogen blowing for 9½ hours, at 190° C. for an additional 24 hours and at 210° C. for 6 hours with stirring and nitrogen blowing in oil and then filtered. A portion of this heat-treated material was blended in 2.5 weight percent concentration in SAE 20 grade lubricating oil and subjected to the Mixmaster test described above. At the end of the 24 hour storage period no separation of additive layer had occurred.

Example 3

550 parts by weight of tert. octyl phenol sulfide and 101 parts of commercial stearyl alcohol were dissolved in 961 parts of a lubricating oil base stock having a viscosity of about 52 seconds Saybolt (at 210° F.). The resulting solution was heated to about 140° C. and 395 grams of barium hydroxide (octahydrate) was added gradually with stirring during about 1½ hours, and then afterwards the reaction mixture was maintained, i. e. heat treated, at 140° C. for an additional ½ hour, and then filtered. It was found that the water-sensitivity of the resultant product was lower than obtained with similar treatment at 120° C.

*Example 4*

The same materials and quantities as used in Example 3 were used again but the neutralization was carried out at a higher temperature by adding ¼ of the total amount of barium hydroxide while heating the oil solution of tert. octyl phenol sulfide from 100° C. to 180° C., and then after adding the rest of the barium hydroxide, the entire reaction mixture was heated for an additional length of time at 180° C., making the total heating time approximately 3 hours. The resultant product, after filtration, was found to have a very low water-sensitivity, namely only 2 cc. of emulsion separating on standing compared to 25 or 30 cc. obtained when a similar neutralization was carried out at 120° C.

The above test results show the remarkable and unexpected advantages of effecting the neutralization at more elevated temperatures than used heretofore, and of heat treating the neutralized solutions, either before or after filtration to remove excess barium hydroxide.

Further work on the above additive concentrate samples showed that the heat treating of the product in addition to eliminating the water sensitivity characteristics, had a beneficial effect on the engine performance properties of the additive. For example, comparable tests were run on blends of the original untreated additive concentrate and of the heat treated product. The blends were of 2.5 weight per cent concentration in a well refined aviation oil of 120 seconds viscosity at 210° F. The tests were run in a CFR engine modified to use an aviation engine type of piston and the tests were run under the following conditions: Jacket temperature, 350° F., oil temperature, 240° F., speed, 1800 R. P. M.; full load. Tests of 50 hours duration. After each engine test was completed, the engine parts were examined and given demerit ratings based on the deposits found on them, particular attention being given to the piston and piston rings. The individual ratings were weighted according to their relative importance and an overall demerit calculated from them. It should be pointed out that the lower the demerit rating the better the engine condition, and hence the better the performance of the oil.

As shown by the data summarized below the effectiveness of the additive concentrate in improving the engine cleanliness of the mineral oil base stock was improved by the heat treatment.

| Oil | Engine demerit ratings | | | |
|---|---|---|---|---|
| | Overall demerit | | Ring zone demerit | Piston skirt varnish demerit |
| | Actual demerit | Per cent reference | | |
| 120 vis. aviation oil | 1.33 | 100 | 3.47 | 2.00 |
| Ditto +2.5 wt. percent additive conc. (not heated) | 0.99 | 66 | 2.82 | 0.88 |
| Ditto +2.5 wt. percent additive conc. (heat treated) | 0.39 | 30 | 1.25 | 0.19 |

Laboratory results have also shown that blends of heat treated metal salts of the alkylated phenol sulfide types have considerably less foaming tendencies than blends of the untreated products.

Although the invention is intended to apply particularly to metal salts resulting directly from reaction with a basic metal neutralizing agent, it may be used to some advantage in the case of corresponding metal salts made by double decomposition from other corresponding metal salts. For instance, one may first prepare a sodium salt of an alkyl hydroxy aryl sulfide such as tertiary amyl phenol sulfide and then treat the latter with anhydrous barium bromide to form the corresponding barium salt of tertiary amyl phenol sulfide. In such a case the heat-treatment may be applied either to the first-formed salt (i. e. the sodium salt) or to the one formed by double decomposition (i. e. the barium salt) or to both.

In addition to the other advantages herein noted for the additives prepared in accordance with the present invention the heat treating process also enhances the compatibility of the alkyl phenol sulfide metal salts with other detergent additives such as metal soaps, metal mahogany sulfonates, metal phenol sulfonates, metal thiocarbamates, metal salts of organo substituted oxy or thioacids of phosphorus, metal alcoholates, and the like. Use of the heat treated products with the above types of additives as well as with antioxidants, thickeners, oiliness agents, pour depressants, viscosity index improvers, and the like is also contemplated.

It is not intended that this invention be limited to any of the specific examples which have been given solely for the purpose of illustration nor unnecessarily by any theory suggested as to the mechanism of the operation of the invention, but only by the appended claims in which it is intended to claim all novelty inherent in the invention as well as all modifications coming within the scope and spirit of the invention.

It is claimed:

1. The process of manufacturing an improved barium tert. octyl phenol sulfide of low water-sensitivity when tested in mineral lubricating oil solution, which comprises dissolving tert. octyl phenol sulfide in a mineral lubricating oil base stock in a concentration of about 10 to 50% by weight, heating the resulting solution to a neutralizing temperature of at least 120° C., gradually adding barium hydroxide with stirring, in sufficient amounts at least to neutralize the tert. octyl phenol sulfide dissolved in the oil, heating the reaction mixture until neutralization has been completed, and then still further heating the reaction mixture for an additional heating time between the approximate limits of ½ hour and 30 hours at a temperature between about 125° C. and about 220° C. to at least substantially reduce the water-sensitivity of said barium salt in lubricating oil solutions.

2. An improved process for manufacturing barium tert. octyl phenol sulfide which comprises dissolving tert. octyl phenol sulfide in a mineral lubricating oil base stock in a concentration of about 10–50% by weight, heating said solution to at least 80° C., and adding at least a neutralizing amount of barium hydroxide to said solution while stirring and heating said solution up to about 180° C. until neutralization has been completed, and then further heating said reaction mixture at about 180° C. for an additional length of time sufficient to make said barium salt solution in mineral oil substantially insensitive to water.

3. The method of inhibiting the tendency of a mineral oil containing in solution a metal salt, which contains at least one grouping having the general formula M—Y—Ar(R)$_n$ where M represents a metal connected through Y which is an element in the right hand side of group VI of the periodic table to Ar which represents an aromatic nucleus containing one or more alkyl substituents R, $n$ being the number of such substituents, to form a sludge during a period of storage of the said oil under conditions where the oil comes into contact with moisture or water which comprises subjecting said metal salt, prior to such period of storage of the oil containing the same, to heat treatment at a temperature of about 125°–220° C., for a period of about 3 to 50 hours.

4. A method according to claim 3 in which the metal salt which is added to the mineral oil contains at least one grouping having the formula M—Y—Ar(R)$_n$—Z$_{n'}$, where M is a metal connected through Y which is an element in the right hand side of group VI of the periodic table to Ar which is an aromatic nucleus containing one or more alkyl substituents R, $n$ indicating the number of such substituents, Z is a member of the sulfur family, and $n'$ is a number from 1 to 5.

5. The method of inhibiting the tendency of a mineral oil containing in solution a metal salt mixture having an average chemical composition corresponding to the general formula M[—O—C$_6$H$_3$(R)—]$_2$S$_n$, in which M is a divalent metal, R is an alkyl group having at least 4 carbon atoms, and $n$ includes values ranging from 1 to 2, to form a sludge during a period of storage of the said oil under conditions where the oil comes into contact with moisture or water which comprises subjecting a 10 to 50% by weight solution of said metal salt mixture in a mineral lubricating oil, prior to such period of storage of the oil containing the same, to heat treatment at a temperature of about 125°–220° C. for a time between the approximate limits of 3 and 50 hours sufficient to reduce the water-sensitivity of the metal salts.

6. A method according to claim 5 in which all the heat treatment is carried out before filtering, and then the mixture is filtered.

7. The method of preparing a mineral oil solution of a metal salt of an alkyl phenol sulfide which will be stable against sludge formation during a period of storage of the said oil under conditions where the oil comes into contact with moisture or water which comprises dissolving an alkyl phenol sulfide in a mineral lubricating oil base stock, heating the resulting solution to at least 80° C. and adding thereto a basic metal neutralizing agent in at least a sufficient amount to neutralize the alkyl phenol sulfide, heating and stirring the mixture until the neutralization has been completed, and then further heat treating the mixture at a temperature of about 125°–220° C. for a time between the approximate limits of 3 and 50 hours sufficient to reduce the water-sensitivity of said metal salt, and subsequently blending the concentrated oil solution of the salt thus produced with a mineral lubricating oil base stock prior to the said period of storage of the oil under conditions of contact with moisture.

JOHN G. McNAB.
DILWORTH T. ROGERS.